Oct. 29, 1940.     C. H. SCOTT     2,220,027
ANNULAR THRUST BEARING
Filed July 6, 1939     2 Sheets-Sheet 1

INVENTOR
CHARLES H. SCOTT,
BY
Arthur Middleton
ATTORNEY.

Oct. 29, 1940.  C. H. SCOTT  2,220,027
ANNULAR THRUST BEARING
Filed July 6, 1939  2 Sheets-Sheet 2

INVENTOR
CHARLES H. SCOTT,
BY
ATTORNEY.

Patented Oct. 29, 1940

2,220,027

UNITED STATES PATENT OFFICE 2,220,027

ANNULAR THRUST BEARING

Charles H. Scott, Westport, Conn., assignor to The Dorr Company, Inc., New York, N. Y., a corporation of Delaware Application July 6, 1939, Serial No. 282,981

1 Claim. (Cl. 308—174)

This invention relates to improvements in antifriction bearing constructions of the vertical thrust bearing type. More in particular, this relates to annular thrust bearings with rolling antifriction members, such as balls. In a more specific sense, this may be termed a turntable construction type.

It is among the objects of this invention to provide low-cost wear-resistant and efficient race ways for the anti-friction members or balls in large diameter vertical annular thrust bearings.

The invention and its objects will be more readily understood if considered, by way of example, in connection with a bearing type which is similar in construction and environment to that disclosed in Patent No. 2,087,725, and which may be considered, although in no restrictive sense, for use in supporting the rotary raking or agitating construction in thickeners, clarifiers, agitators, bowl classifiers, etc.

Ball bearing constructions of this type if operated at the relatively slow speed of turntables or turntable-like constructions, and under light load, may function satisfactorily and with reasonably little wear, even though the balls be permitted to operate directly upon the cast-iron faces of the race ways of the bearing members. However, with greater loads and possibly with higher speeds, more highly wear resistant race ways become desirable, lest excessive wear or casting defects or weak spots in the race ways should cause the entire bearing member to be thrown into discard.

In order to attain the above objects, it is herein proposed to utilize commercially available stock material of suitable wearing qualities to provide wear resisting lining strips for the bearing members or castings.

According to one feature, a suitable length or strip of linear stock material is bent or shaped into an open ring element or ring sector of suitable diameter or radius respectively. This element is adapted to be firmly attached to or fitted into the respective casing so as to be unitary therewith and to provide a wear-resistant lining thereon.

According to another feature, a lining strip is provided for each load bearing contact point of the anti-friction balls, such lining strips to be press-fitted into the respective bearing members or castings.

Still another feature has to do with the novel construction and arrangement of a cage for the anti-friction balls.

In one specific embodiment the lining strip is obtained from a continuous band or wire of substantially rectangular non-square cross-section. It is a commercially available material produced by a continuous drawing and continuous tempering process, and therefore known as cold-drawn continuously tempered stock having qualities of ductility and hardness respectively suited for the present purpose. A lining strip bent from this material is press-fitted flat into a machined groove in the bearing member or casting.

Some of the advantages of this invention are that there is produced an inexpensive race way from relatively inexpensive, although specially processed, that is tempered, stock material adapted to suit and to be worked into any bearing diameter; that new castings having defects previously susceptible to wear, need not be scrapped because of the novel lining strips passing over defective spots; and that replacements of such castings because of bearing wear are practically unnecessary, all of which more than offsets the relatively slight cost of the lining strips.

The invention possesses other objects and features of advantage, some of which, with the foregoing, will be set forth in the following description. In the following description and in the claim, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof will best be understood from the following description of a specific embodiment when read in connection with the accompanying drawings.

More in particular, the invention is not considered to be confined in its use to the class of apparatus therein illustrated, but should be understood to apply likewise to all turntable-like constructions which as such are run at moderate speed, as are railway turntables, cranes, revolving stages, merry-go-rounds, display turntables, and others.

In the drawings:

Fig. 3 is an enlarged detail view of Fig. 1, showing the anti-friction balls and the novel race ways therefor, as well as a ball cage of novel construction and arrangement.

Fig. 4 is a further enlargement of Fig. 3, showing a more specific cross-section of the wearing strip as fitted into the bearing members.

Figure 1:
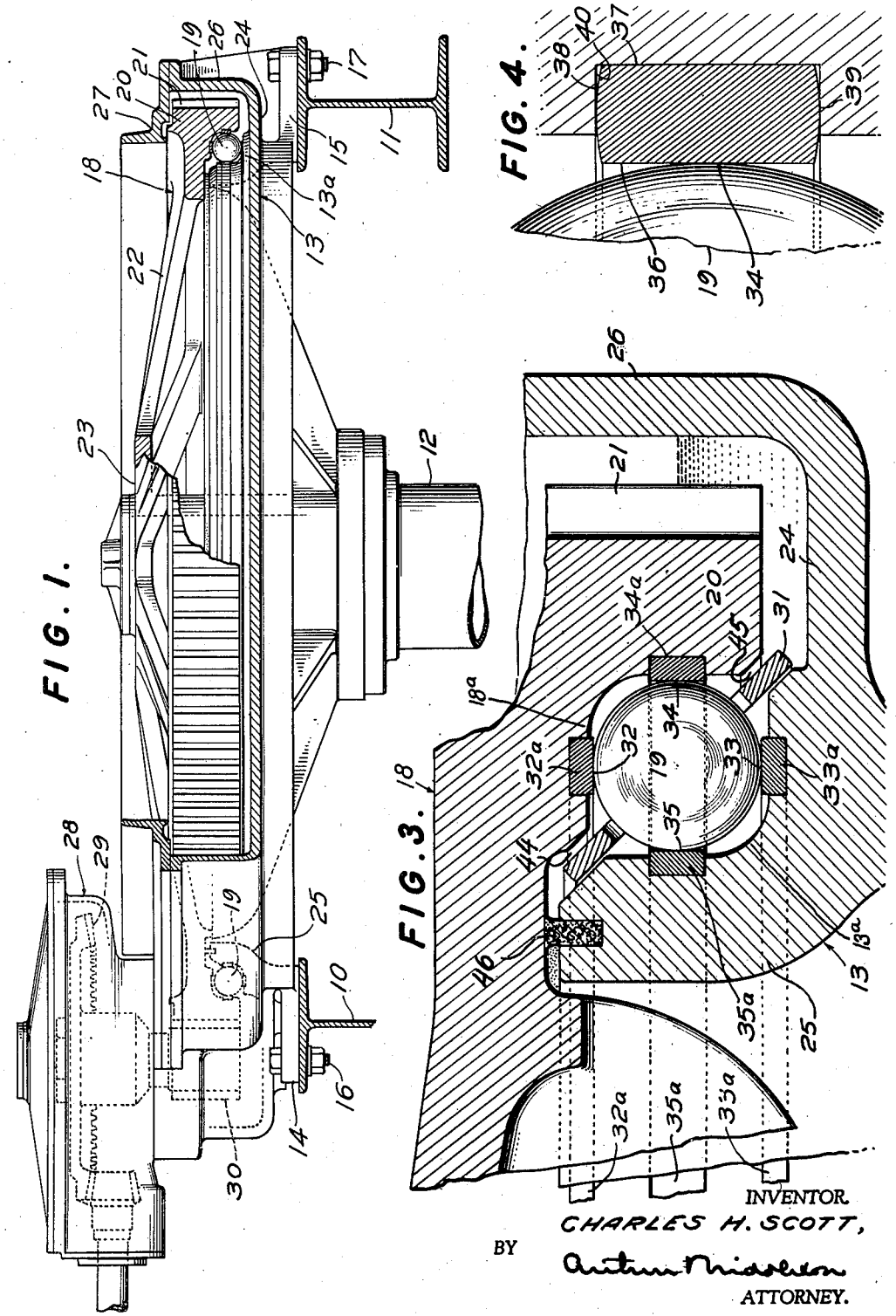
Fig. 1 is a part sectional side view of a combination vertical annular thrust bearing and drive arrangement, with novel lining strips as ball race ways.

The bearing construction illustrated in Fig. 1 is shown to be supported by beams 10 and 11, which in turn may be mounted, if the example of the above mentioned patent to Scott, No. 2,087,725, be adhered to, upon a settling tank or the like, in which a vertical raking or agitating shaft may operate, such as indicated in Fig. 1 by the numeral 12.

The construction of the thrust bearing proper comprises a stationary bearing member or casting 13 having an annular thrust receiving portion 13a, and having lugs 14 and 15, indicated to support it upon the beams 10 and 11, and fastened thereto as by bolts 16 and 17. The rotary part of this construction comprises a rotary bearing member 18 having a corresponding annular load transmitting portion 18a operating upon the stationary bearing member 13 by way of anti-friction balls 19 interposed between said rotary thrust transmitting portion 18a and said stationary thrust receiving portion 13a.

The rotary bearing member 18 is herein shown to be in the nature of a gear element having a rim portion 20 provided with teeth 21. This gear member further has a spider portion consisting of spokes 22 and a hub portion 23 which latter holds the initially mentioned vertical shaft 12 which rotates with the rotary part of the construction.

The stationary bearing member 13 constitutes an annular trough-like construction serving as a receptacle to hold a bath of lubricating oil for the anti-friction balls 19 and for the gear teeth 21. This trough-like construction has a bottom portion 24, an inner cylindrical wall portion 25 and an outer cylindrical wall portion 26, which latter is shown to be higher than the inner cylindrical wall portion, and has mounted thereon an annular cover portion 27 overlying the ring portion of the rotary member 18 and adapted to serve as an anti-tilting element therefor. Unitary with the stationary bearing member 13 is a gear casing 28 containing drive gearing collectively designated by the numeral 29, and a pinion 30 in driving engagement with the teeth of the rotary member 18 for rotating the same.

The essence of the invention lies in the novel manner of providing suitable race ways for the anti-friction balls 19, and also in the design and construction thereof. This is more clearly shown in the enlarged detailed view of Fig. 3, taken from Fig. 1, like numerals being used to designate respective like parts. However, the detailed view in addition shows a cage element 31 or a peculiar conical shape for the balls 19, which cage element is specifically designed to suit the four point load bearing arrangement of this bearing construction. There is an upper and a lower load bearing contact point 32 and 33 respectively, and an outer and inner contact point 34 and 35 respectively between the balls and their respective race ways. The cage element 31 is disposed on a forty-five degree incline and symmetrically between the two pairs of bearing contact points, one pair being the upper and the outer contact points 32 and 34 on the rotary member 18, the other pair being the lower and the inner contact points 33 and 35 on the stationary member 13.

Accordingly there is provided a race way for each respective load bearing contact point, each race way being represented by a wearing strip, making it four such wearing strips, an upper 32a, a lower 33a, an outer 34a, and an inner 35a. Each wearing strip is herein shown to be of substantially flat, rectangular cross-section, the details of the cross-section of the strip and its mounting being more clearly shown in the further enlarged detail of Fig. 4. There are the wide top and bottom faces 36 and 37, and the narrow sides 38 and 39 of the cross-section, the side faces being slightly convex and adapted to be press-fitted for instance into a suitably machined groove 40 provided in a respective thrust bearing member of the construction.

Figure 2:
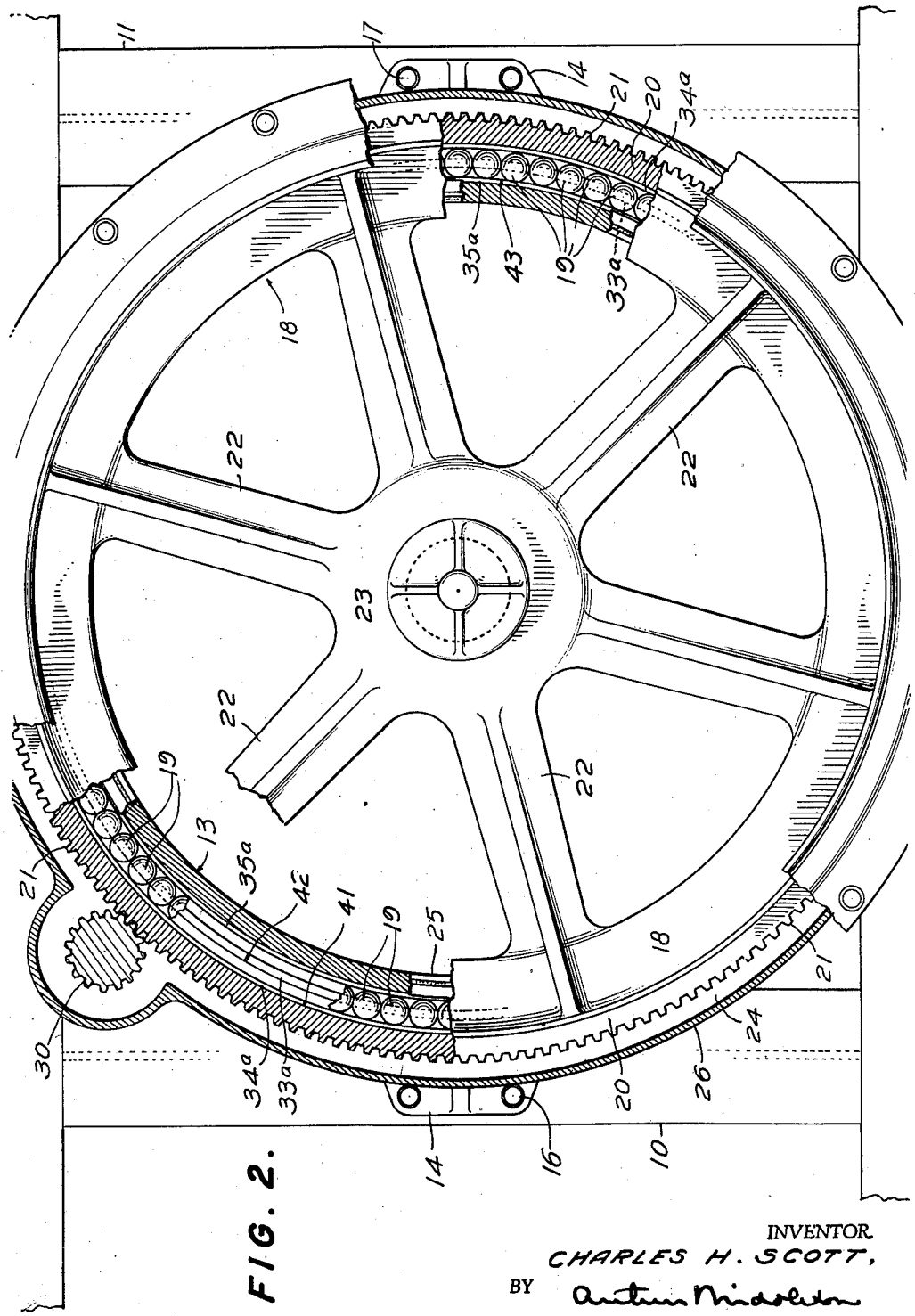
Fig. 2 is a plan view of Fig. 1, with parts partly in section.

Furthermore the wearing strips or race ways according to this invention are of cold drawn continuously tempered stock. Each wearing strip or race way is formed or bent into a ring-like element with a pair of adjoining ends, and the length of a strip thus prepared is such that when in place its ends are buttwise adjoining, leaving a slight gap between them, such gaps being indicated in Fig. 2 by the numerals 41, 42, and 43, in connection with the outer, lower and inner wearing strip respectively.

When applying the wearing strip to its respective bearing member or casting, a length of strip suitably conditioned or bent or rolled into ring-shape is press-fitted into its respective groove in the casting, beginning with one end of the strip and then progressively pressing successive portions thereof into place in the groove. A slight gap remaining between the buttwise adjoining ends of the strip when in place does not impair the function and effectiveness of the race way, as such, due to the large number of balls that are actively bearing the load at all times, even though one ball might be temporarily relieved of its load while passing over the gap.

The bottom of the groove in the casting is machined so that the strip when fitted therein will furnish the desired operating diameter for the raceway. Due to the convexity of the sides of the strip the same will readily enter its groove, then to be press-fitted tightly as it is forced down to the bottom of the groove.

In a practical instance the wearing strip is a flat wire, having top and bottom faces one-half inch wide, sides seven-thirty-seconds of an inch high, the groove in the casting being about three-sixteenths of an inch deep, permitting one-thirty-second of an inch of the height of the wire to protrude above the groove. A slight convexity of the sides of the wire permits the same to be press-fitted into the groove. 1½" is a suitable diameter for the balls 19.

Advantages of providing wearing strips or race ways of this kind according to the invention are that the castings are preserved as regards resistance to wear and possible scrapping, that any raceway diameter can be taken case of from suitable stock material commercially available and kept on hand for making the wearing strips.

Also the lining strip according to the invention is readily and cheaply replaceable. For the present purpose the material of this strip combines suitable hardness with a desired degree of ductility, and a Brinell hardness of 300 to 400 will suit this purpose.

According to Fig. 3, the cage element 31 in the shape of a hollow truncated cone lodges between the stationary and rotary bearing members 13 and 18 respectively, namely in an upper clearance or gap 44 and a lower clearance or gap 45 provided between the two bearing members, so that the cage element is thereby held in its proper operating position with respect to the largest diameter of the balls 19.

The numeral 46 designates a felt strip provided on the stationary member 13 for closing a gap between it and the rotary bearing member 18.

I claim:

A thrust bearing construction having a stationary bearing member extending in a horizontal plane, and adapted to receive a vertical thrust load, a correspondingly shaped and disposed rotary bearing member adapted to impart said thrust load to said first bearing member, the surfaces facing each other of said bearing members having corresponding disposed concentric annular grooves also facing each other, a wearing strip force-fitted into and thereby retained in each groove to provide a raceway element, and anti-friction elements interposed between and operatively engaged by said raceways.

CHARLES H. SCOTT.